US010800475B1

(12) United States Patent
Luedtke et al.

(10) Patent No.: US 10,800,475 B1
(45) Date of Patent: Oct. 13, 2020

(54) MICRO-MOBILITY FLEET VEHICLE COCKPIT ASSEMBLY SYSTEMS AND METHODS

(71) Applicant: Lyft, Inc., San Francisco, CA (US)

(72) Inventors: Peter Rex Luedtke, San Francisco, CA (US); Kelly Erin Johnson, San Francisco, CA (US); Alejandro Salvador Garcia, San Francisco, CA (US); Sanket Parshuram Phalgaonkar, San Francisco, CA (US); Oliver Maximilian Mueller, San Francisco, CA (US); Jeffrey Allen Boyd, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/729,070

(22) Filed: Dec. 27, 2019

(51) Int. Cl.
| | | |
|---|---|---|
| *B62J 6/00* | (2020.01) | |
| *B62J 99/00* | (2020.01) | |
| *B62J 6/029* | (2020.01) | |
| *B62J 11/00* | (2020.01) | |
| *B62J 50/22* | (2020.01) | |
| *B62M 6/90* | (2010.01) | |
| *B62K 21/12* | (2006.01) | |
| *B62J 45/41* | (2020.01) | |
| *B62M 6/40* | (2010.01) | |
| *B62J 50/21* | (2020.01) | |

(52) U.S. Cl.
CPC ............... *B62J 99/00* (2013.01); *B62J 6/029* (2020.02); *B62J 11/00* (2013.01); *B62J 45/41* (2020.02); *B62J 50/22* (2020.02); *B62J 50/225* (2020.02); *B62K 21/125* (2013.01); *B62M 6/40* (2013.01); *B62M 6/90* (2013.01)

(58) Field of Classification Search
CPC . B62J 99/00; B62J 50/22; B62J 50/225; B62J 11/00; B62M 6/40; B62K 21/12; B60R 11/02
See application file for complete search history.

(56) References Cited

U.S. PATENT DOCUMENTS

| | | | |
|---|---|---|---|
| 7,070,295 B1* | 7/2006 | Lee ............................ | B62J 6/02 362/191 |
| 2015/0210334 A1* | 7/2015 | Armstrong ............... | B62J 11/00 74/551.8 |
| 2016/0107517 A1* | 4/2016 | Larray ..................... | B60K 1/04 180/220 |
| 2016/0129962 A1* | 5/2016 | Langevin ............... | H04N 5/772 386/226 |

(Continued)

*Primary Examiner* — Tony H Winner
(74) *Attorney, Agent, or Firm* — Haynes and Boone, LLP

(57) ABSTRACT

A cockpit assembly for a micro-mobility fleet vehicle may include at least two visible and at least partially opposed faces linked by a fold aligned along an axis of a handlebar assembly, such as a first face, a second face, and an intermediate portion connecting the first face to the second face. The first face may include a headlight assembly. The second face may include a display of a user interface that is arranged to face a rider of the fleet vehicle. The display may be disposed adjacent to and/or beneath a mobile device holder. The first face, the second face, and the intermediate portion may wrap at least partially around the handlebar assembly to position the first face towards a front of the fleet vehicle and the second face towards a rear, a rider, and/or a seat of the fleet vehicle.

22 Claims, 12 Drawing Sheets

(56) References Cited

U.S. PATENT DOCUMENTS

| | | | | |
|---|---|---|---|---|
| 2016/0200383 A1* | 7/2016 | McAleese | ............ | B62J 6/01 |
| | | | | 315/79 |
| 2017/0284433 A1* | 10/2017 | Thomas | ............ | F16M 11/14 |
| 2018/0072377 A1* | 3/2018 | Kishita | ............ | B62M 6/40 |
| 2018/0334216 A1* | 11/2018 | Montez | ............ | B62K 19/40 |
| 2019/0084640 A1* | 3/2019 | Eguchi | ............ | B62J 6/02 |
| 2019/0144068 A1* | 5/2019 | David | ............ | B62K 23/02 |
| | | | | 180/208 |

* cited by examiner

MICRO-MOBILITY FLEET VEHICLE COCKPIT ASSEMBLY SYSTEMS AND METHODS

TECHNICAL FIELD

One or more embodiments of the present disclosure relate generally to micro-mobility fleet vehicles and more particularly, for example, to systems and methods for a cockpit assembly for a micro-mobility fleet vehicle.

BACKGROUND

Contemporary micro-mobility fleet vehicles (e.g., scooters, sit-scooters, bicycles, etc.) are often retrofitted with aftermarket accessories or devices to participate in an associated transportation management system. For example, contemporary micro-mobility fleet vehicles may be retrofitted with one or more visibility, interface, and/or communication elements to comply with safety regulations and/or requirements of the transportation management system. Such retrofitting of components may expose the add-on components to damage, vandalism, and/or theft. In addition, the retrofitted components may be cumbersome and/or undesirable to a user. For example, the retrofitted components may not be aesthetically pleasing and/or may not be intuitive to operate.

Therefore, there is a need in the art for systems and methods for a cockpit assembly of a micro-mobility fleet vehicle, the cockpit assembly incorporating the desired and/or necessary components into a seamless design.

SUMMARY

Techniques are disclosed for systems and methods associated with a cockpit assembly for a micro-mobility fleet vehicle. In accordance with one or more embodiments, the cockpit assembly may include a first face including a headlight assembly configured to illuminate a road surface substantially in front of the micro-mobility fleet vehicle, a second face disposed substantially opposite the first face and including a mobile computing device holder or a display of a user interface for the micro-mobility fleet vehicle, and an intermediate portion connecting a first top portion of the first face to a second top portion of the second face. The first face, the second face, and the intermediate portion may be configured to wrap at least partially around a handlebar assembly for the micro-mobility fleet vehicle to orient the first face on a forward-facing portion and/or towards a front of the micro-mobility fleet vehicle and the second face on a rearward-facing portion and/or towards a rear of the micro-mobility fleet vehicle. The first face, the second face, and the intermediate portion may form part of a unitary structure configured to couple to the handlebar assembly for the micro-mobility fleet vehicle. The mobile computing device holder may include a first gripping element and a second gripping element movable relative to the first gripping element to secure mobile computing devices of various sizes to the cockpit assembly. The user interface may include an electronic ink display. The headlight assembly may include a strip array of programmable light emitting elements arranged to encompass a pill-shaped center region of the first face. The headlight assembly may include a cone beam light assembly disposed within the pill-shaped center region. A camera may be disposed within the pill-shaped center region of the first face.

In accordance with one or more embodiments, a cockpit assembly for a micro-mobility fleet vehicle may include two at least partially opposed faces linked by an arcuate panel curved along a long axis of a handlebar assembly, the two at least partially opposed faces including a first face and a second face. The first face may include a headlight assembly. The second face may include a mobile computing device holder. The second face may include a display for a user interface for the micro-mobility fleet vehicle that is disposed adjacent to and/or beneath the mobile computing device holder and is configured to face a rear of the micro-mobility fleet vehicle. The first face may include a pill-shaped center region. The headlight assembly may include a cone beam light assembly disposed within the pill-shaped center region. The headlight assembly may include a strip array of light emitting and/or reflecting elements defining the pill-shaped center region. The strip array may include a reflective tape. The strip array may include a plurality of programmable light emitting elements configured to provide asymmetrically biased peripheral lighting during operation of the headlight assembly. The programmable light emitting elements may be configured to provide color and/or luminosity-differentiated animated light patterns during operation of the headlight assembly. A camera may be disposed within the pill-shaped center region of the first face.

In accordance with one or more embodiments, a micro-mobility fleet vehicle may include a handlebar assembly and a cockpit assembly coupled to the handlebar assembly. The cockpit assembly may include a substantially vertical first face including a headlight assembly configured to illuminate a road surface substantially in front of the micro-mobility fleet vehicle, a second face, inclined relative to the substantially vertical first face, including a mobile computing device holder or a display of a user interface for the micro-mobility fleet vehicle, and an intermediate portion connecting the first face to the second face. The first face, the second face, and the intermediate portion may be wrapped at least partially around the handlebar assembly to orient the first face towards the front of the micro-mobility fleet vehicle and the second face towards the rear of the micro-mobility fleet vehicle. The intermediate portion may include an arcuate panel curved along a long axis of the handlebar assembly and configured to orient the first face away from a user support of the micro-mobility fleet vehicle and to orient the second face towards the user support. The cockpit assembly may be implemented as a unitary structure that forms at least a portion of an outer housing of the handlebar. The user support may include a seat or a standing platform of the micro-mobility fleet vehicle.

In accordance with one or more embodiments, a method may include attaching a cockpit assembly to a handlebar assembly of a micro-mobility fleet vehicle, configuring a first face of the cockpit assembly, and configuring a second face of the cockpit assembly. The first face may be configured with a headlight assembly. The first face may be configured with a camera. The second face may be configured with a mobile device holder and/or a display of a user interface for the micro-mobility fleet vehicle. The cockpit assembly may be coupled to the micro-mobility fleet vehicle such that the cockpit assembly wraps at least partially around a central stem assembly of the handlebar assembly for the micro-mobility fleet vehicle.

In accordance with one or more embodiments, a method may include rendering information on a user interface of a cockpit assembly of a micro-mobility fleet vehicle. The method may further include mounting a portable electronic device over the user interface and/or illuminating a path of the micro-mobility fleet vehicle via a headlight assembly of the cockpit assembly.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sit-scooters, scooters, bicycles, and other micro-mobility fleet vehicles with handlebars benefit from a functional, intuitive, and distinctive cockpit assembly. The cockpit assembly may be implemented with at least two visible and at least partially opposed faces linked by a fold substantially aligned with an axis of a handlebar of a fleet vehicle, where a first face includes a headlight and a second face includes a user interface. The cockpit assembly may form at least part of an outer housing for a control module and wiring interface of the cockpit assembly. The cockpit assembly may be shaped to form a water-resistant seal to the handlebar and to reduce risk of damage to the headlight and the user interface when the fleet vehicle tips over.

The headlight may include a light ring including a strip array of light emitting elements arranged to encompass a pill-shaped center region of the first face. The strip array may be configured to provide asymmetrically biased peripheral lighting during operation. Additionally, or alternatively, the strip array may be configured to provide color and/or luminosity-differentiated animated light patterns during operation. The strip array may be supplemented with a cone beam light assembly disposed within the pill-shaped center region. A camera may be disposed adjacent to the cone beam light assembly within the pill-shaped center region.

Figure 1:
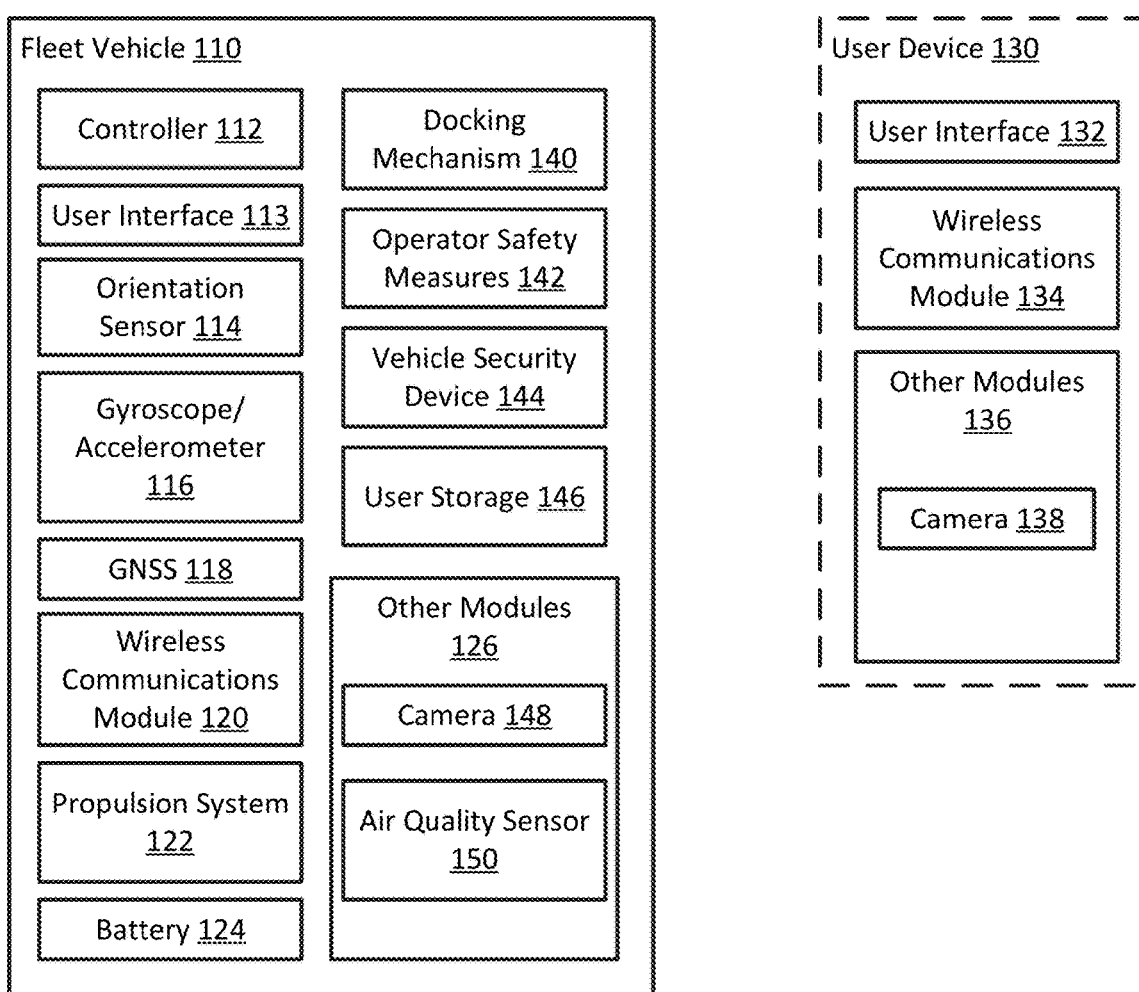
FIG. 1 illustrates a block diagram of a portion of a dynamic transportation matching system including a fleet vehicle in accordance with an embodiment of the disclosure.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120. More generally, camera 148 may be configured to perform any of the operations or methods described herein, at least in part, or in combination with controller 112 and/or user interface 113 or 132.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
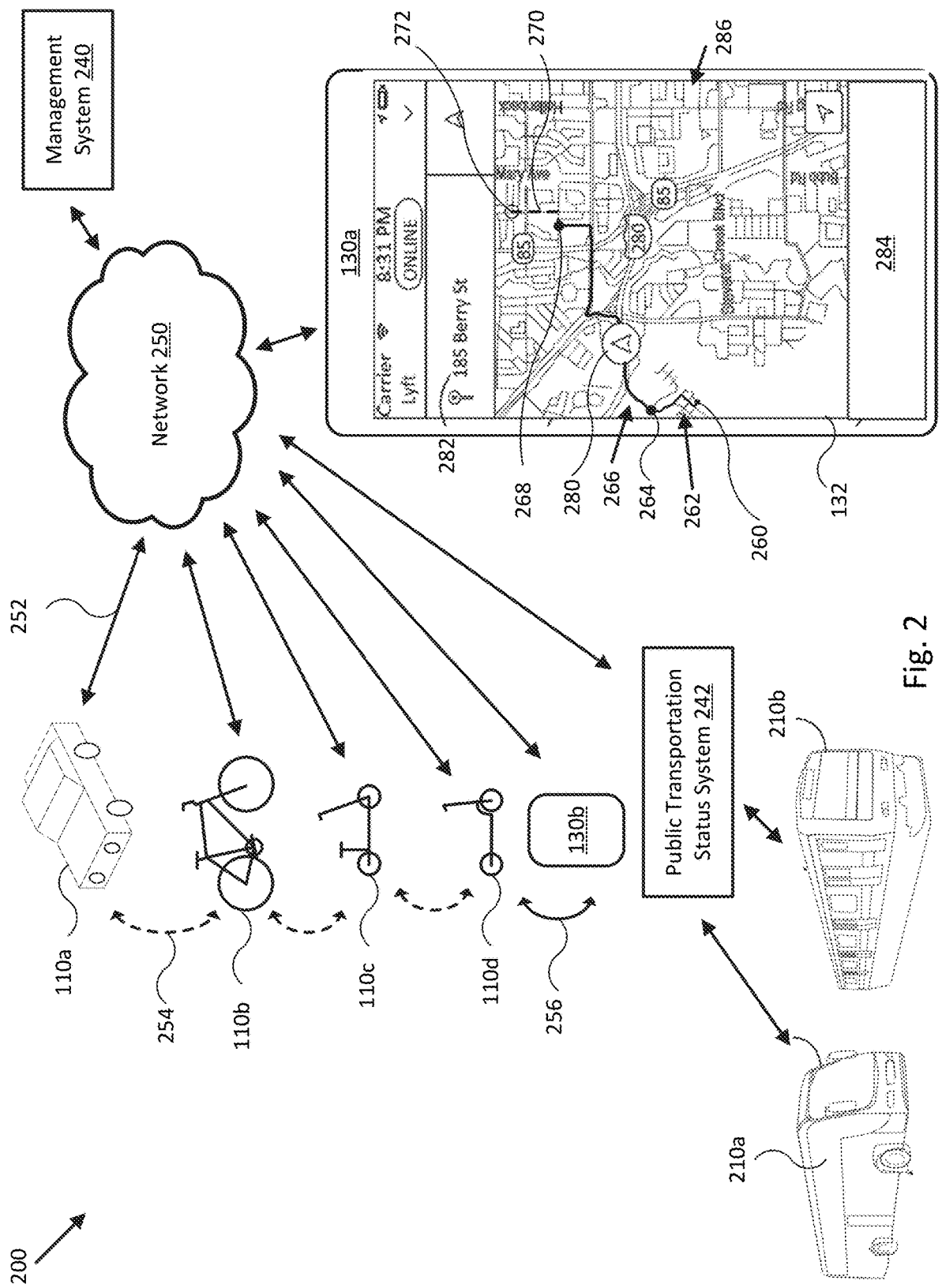
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130a to hire or rent one of fleet vehicles 110a-d by transmitting a transportation request to management system 240 over WAN 250, allowing management system 240 to poll status of fleet vehicles 110a-d and to select one of fleet vehicles 110a-d to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130b, but where the requestor is able to enable a fleet vehicle over local communication link 263, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110a-d, as described herein.

User device 130a in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110b, 110c, or 110d) from bus stop 268 to destination 272. Also shown rendered by user interface 132 are present location indicator 280 (indicating a present absolute position of user device 130a on street map 486), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
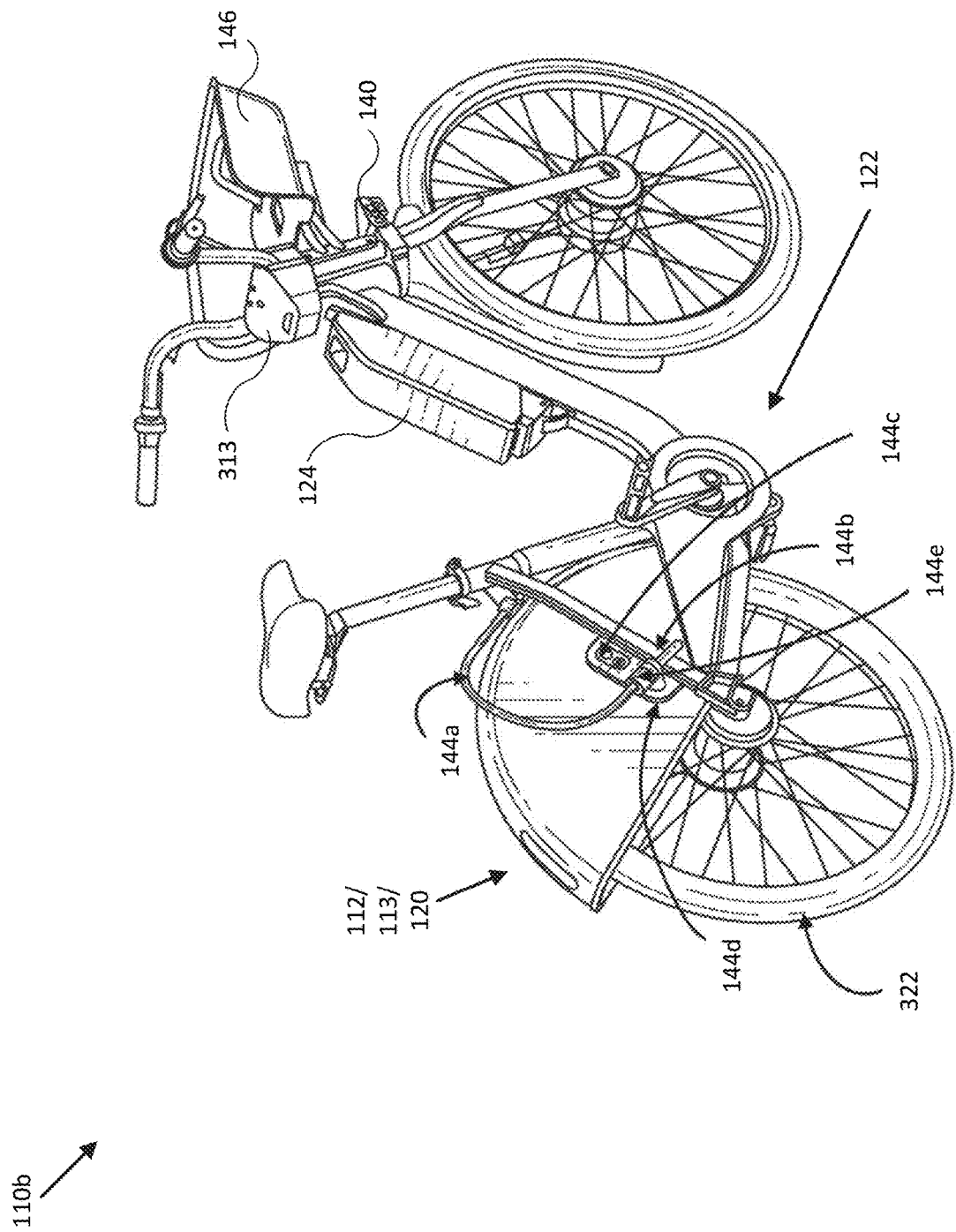
FIGS. 3A-C illustrate diagrams of micro-mobility fleet vehicles for use in a dynamic transportation matching system in accordance with an embodiment of the disclosure.
Figure 3B:
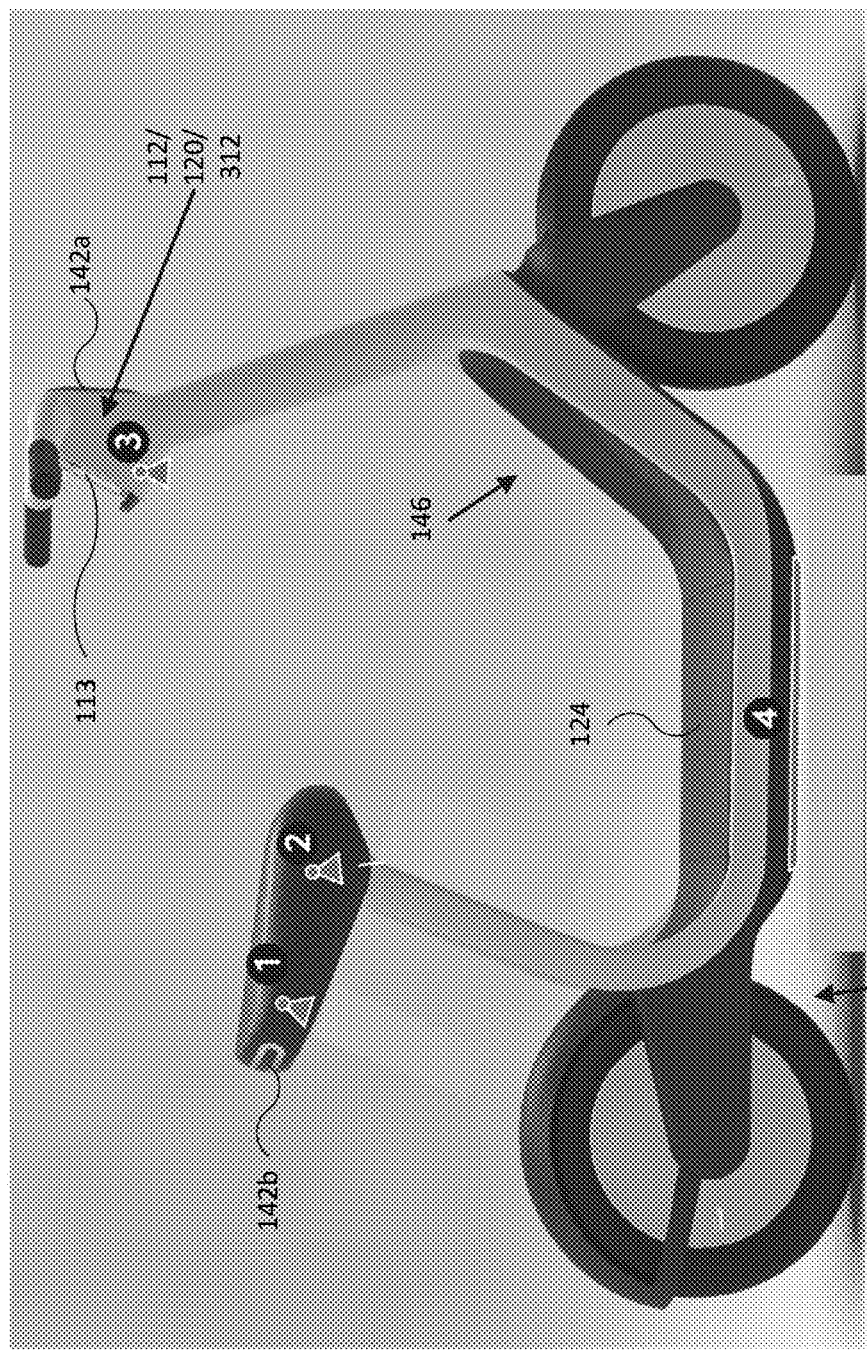
Figure 3C:
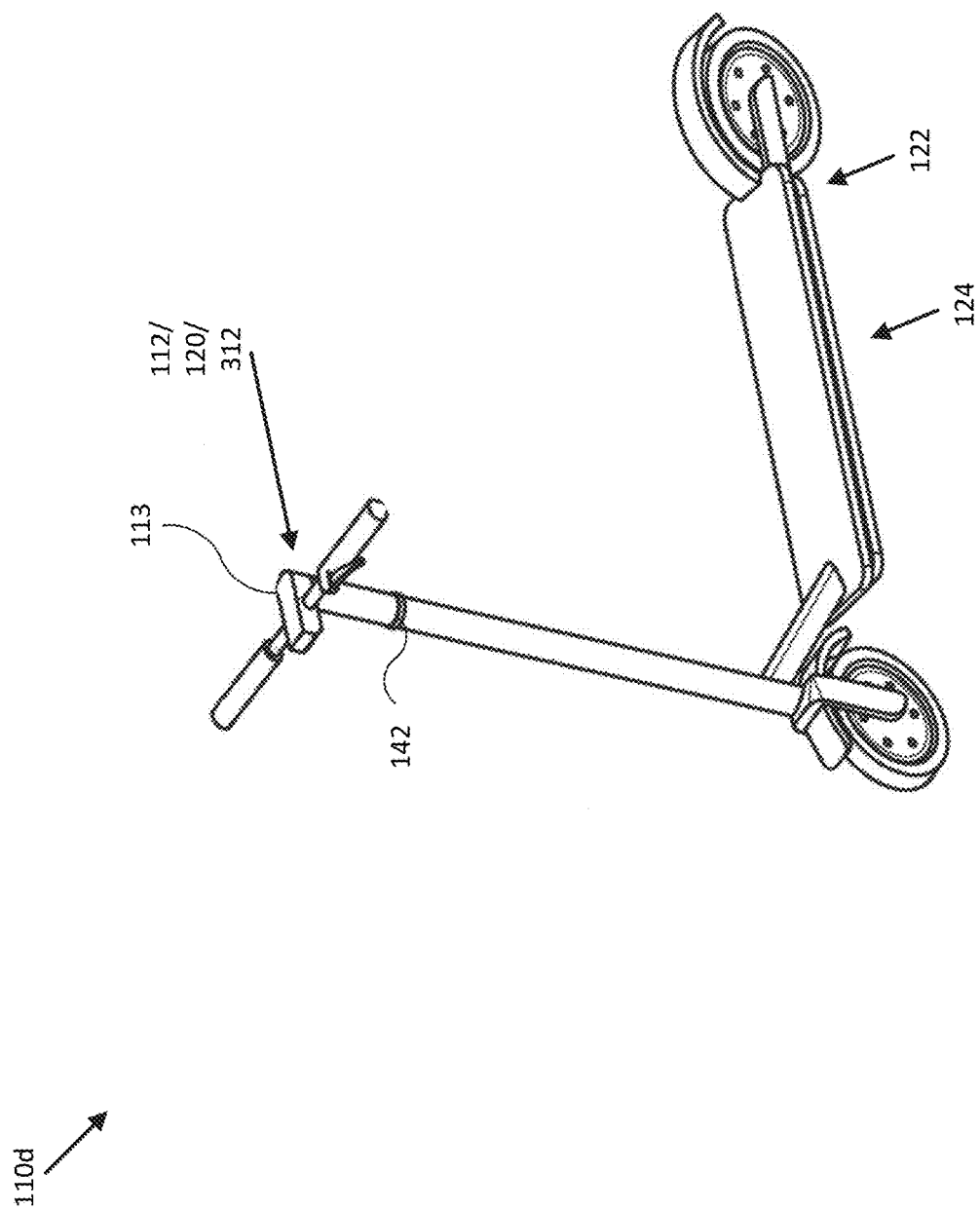

FIGS. 3A-C illustrate diagrams of micro-mobility fleet vehicles 110b, 110c, and 110d, which may be integrated with mobile mesh network provisioning systems in accordance with an embodiment of the disclosure. For example, fleet vehicle 110b of FIG. 3A may correspond to a motorized bicycle for hire that is integrated with the various elements of system 100 and may be configured to participate in dynamic transportation matching system 200 of FIG. 2. As shown, fleet vehicle 110b includes controller/user interface/wireless communications module 112/113/120 (e.g., integrated with a rear fender of fleet vehicle 110b), propulsion system 122 configured to provide motive power to at least one of the wheels (e.g., a rear wheel 322) of fleet vehicle 110b, battery 124 for powering propulsion system 122 and/or other elements of fleet vehicle 110b, docking mechanism 140 (e.g., a spade lock assembly) for docking fleet vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of fleet vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize fleet vehicle 110b by default, thereby requiring a user to transmit a hire request to management system 240 (e.g., via user device 130) to hire fleet vehicle 110*b* before attempting to use fleet vehicle 110*b*. The hire request may identify fleet vehicle 110*b* based on an identifier (e.g., a QR code, a barcode, a serial number, etc.) presented on fleet vehicle 110*b* (e.g., such as by user interface 113 on a rear fender of fleet vehicle 110*b*). Once the hire request is approved (e.g., payment is processed), management system 240 may transmit an unlock signal to fleet vehicle 110*b* (e.g., via network 250). Upon receiving the unlock signal, fleet vehicle 110*b* (e.g., controller 112 of fleet vehicle 110*b*) may release vehicle security device 144 and unlock rear wheel 322 of fleet vehicle 110*b*.

Fleet vehicle 110*c* of FIG. 3B may correspond to a motorized sit-scooter for hire that is integrated with the various elements of system 100 and may be configured to participate in dynamic transportation matching system 200 of FIG. 2. As shown in FIG. 3B, fleet vehicle 110*c* includes many of the same elements as those discussed with respect to fleet vehicle 110*b* of FIG. 3A. For example, fleet vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of headlights, programmable light strips, and/or reflective strips.

Fleet vehicle 110*d* of FIG. 3C may correspond to a motorized stand or kick scooter for hire that is integrated with the various elements of system 100 and may be configured to participate in dynamic transportation matching system 200 of FIG. 2. As shown in FIG. 3C, fleet vehicle 110*d* includes many of the same elements as those discussed with respect to fleet vehicle 110*b* of FIG. 3A. For example, fleet vehicle 110*d* may include user interface 113, propulsion system 122, battery 124, controller/wireless communications module/cockpit enclosure 112/120/312, and operator safety measures 140, which may be implemented as various types programmable light strips and/or reflective strips, as shown.

Figure 3D:
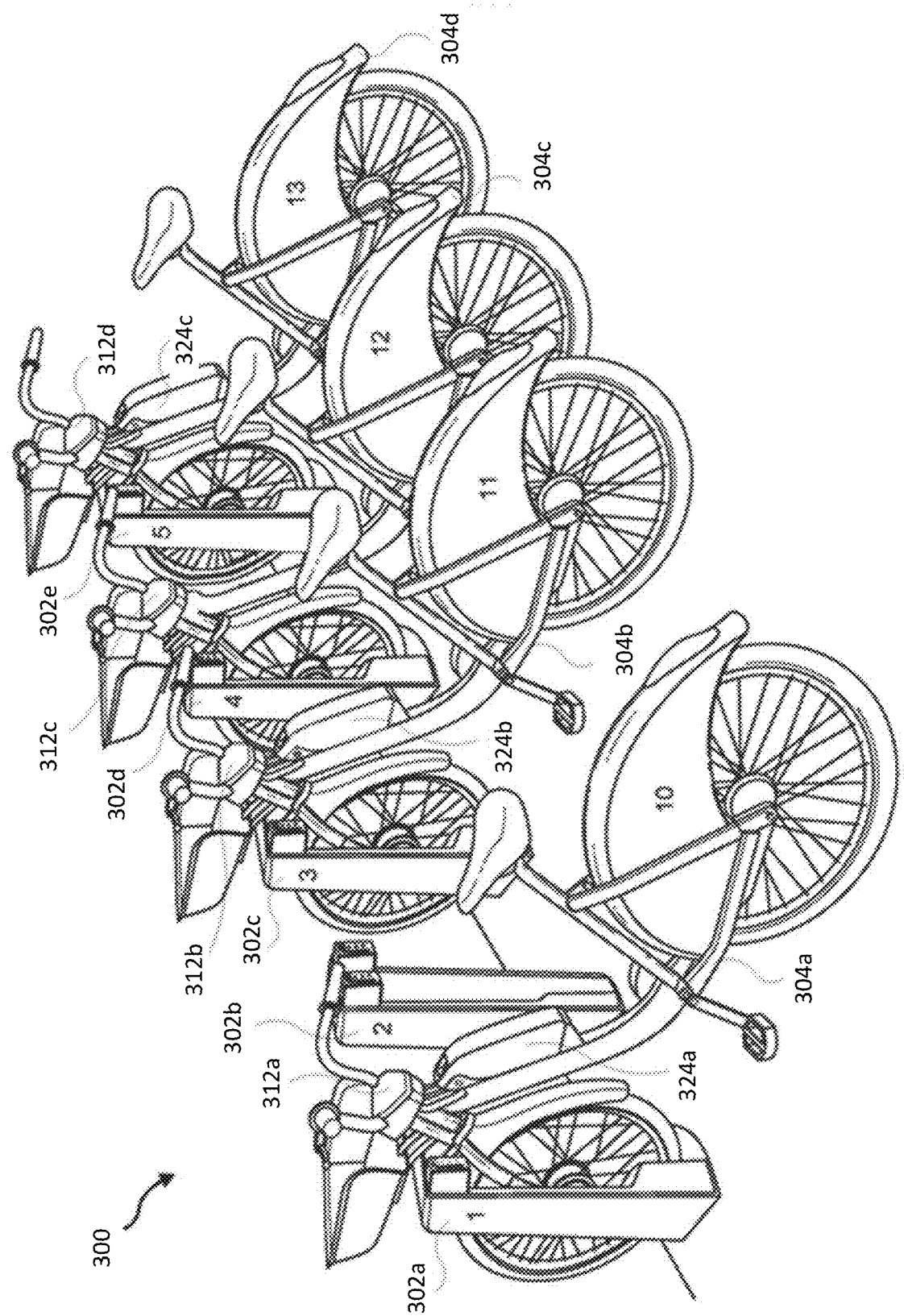
FIG. 3D illustrates a diagram of a docking station for docking fleet vehicles in accordance with an embodiment of the disclosure.

FIG. 3D illustrates a docking station 300 for docking fleet vehicles (e.g., fleet vehicles 110*c*, 110*e*, and 110*g*, etc.) according to one embodiment. As shown, docking station 300 may include multiple bicycle docks, such as docks 302*a-e*. In this example, a single fleet vehicle (e.g., any one of electric bicycles 304*a-d*) may dock in each of the docks 302*a-e* of the docking station 300. Each of the docks 302*a-e* may include a lock mechanism for receiving and locking docking mechanism 140 of the electric bicycles 304*a-d*. In some embodiments, once a fleet vehicle is docked in a bicycle dock, the dock may be electronically coupled to the fleet vehicle (e.g., controllers 312*a-d* of the fleet vehicle) via a link such that the fleet vehicle and the dock may communicate with each other via the link.

A user may use a user device (e.g., user device 130) to hire a fleet vehicle that is docked in one of the bicycle docks 302*a-e* by transmitting a hire request to management system 240. Once the hire request is processed, management system 240 may transmit an unlock signal to the electric bicycle docked in the dock and/or the dock via network 250. The dock may automatically unlock the lock mechanism to release the electric bicycle based on the unlock signal. In some embodiments, each of the docks 302*a-e* may also be configured to charge batteries (e.g., batteries 324*a-c*) of the electric bicycle 304*a-d*, respectively, when the electric bicycle 304*a-d* are docked at the docks 302*a-e*. In some embodiments, docking station 300 may also be configured to transmit information associated with the docking station 300 (e.g., a number of fleet vehicles docked at the docking station 300, charge statuses of the docked fleet vehicles, etc.) to the management system 240.

Figure 4:
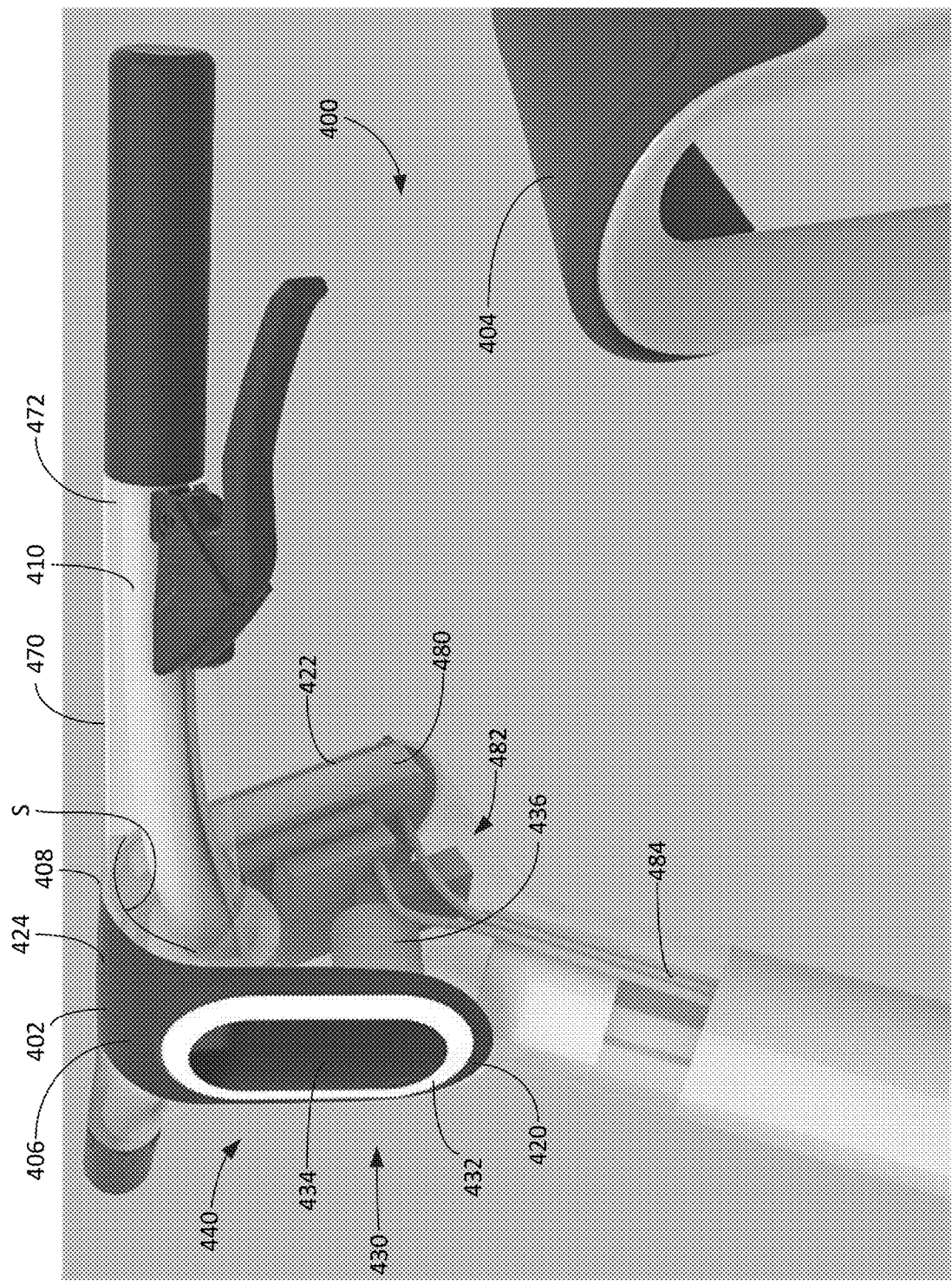
FIG. 4 illustrates a front perspective view of a cockpit assembly for a micro-mobility fleet vehicle in accordance with an embodiment of the disclosure.
Figure 5:
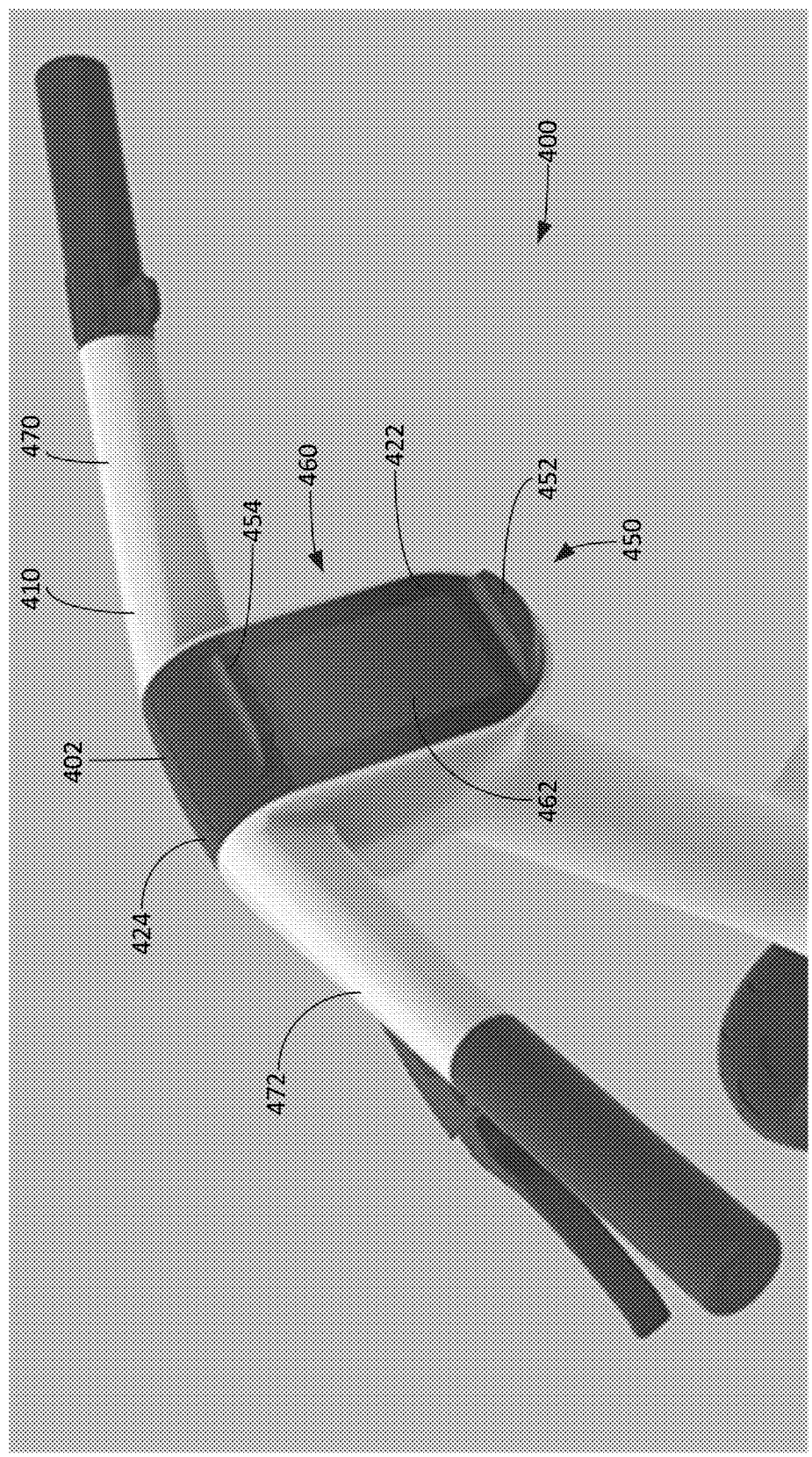
FIG. 5 illustrates a rear perspective view of the cockpit assembly of FIG. 4 in accordance with an embodiment of the disclosure.

FIG. 4 illustrates a front perspective view of a cockpit assembly for a micro-mobility fleet vehicle in accordance with an embodiment of the disclosure. FIG. 5 illustrates a rear perspective view of the cockpit assembly of FIG. 4 in accordance with an embodiment of the disclosure. Referring to FIGS. 4 and 5, a micro-mobility fleet vehicle 400 may include a cockpit assembly 402. In some embodiments, the micro-mobility fleet vehicle 400 may include a user support 404 allowing a user to ride the micro-mobility fleet vehicle 400. Depending on the type of fleet vehicle, the user support 404 may be a seat, a standing platform, or the like, or any combination thereof. As described herein, the cockpit assembly 402 may provide a functional, intuitive, and distinctive cockpit or user interface for the user when riding the fleet vehicle 400. For example, the cockpit assembly 402 may be implemented with a plurality of regions, interfaces, or elements integrating various components and/or features together. The micro-mobility fleet vehicle 400 may be similar to any one of the micro-mobility fleet vehicles 110, 110*a-d*, described above.

The cockpit assembly 402 may include many configurations. As shown in FIGS. 4 and 5, the cockpit assembly 402 may include at least two visible and at least partially opposed faces linked by a fold aligned along a long axis of a handlebar assembly 410 for the micro-mobility fleet vehicle 400. Depending on the application, the cockpit assembly 402 may include a first face 420, a second face 422, and an intermediate portion 424 connecting the first face 420 to the second face 422. The first face 420 may include many configurations. For example, the first face 420 may be planar, curved along its length, curved along its width, or any combination thereof. Depending on the application, the first face 420 may extend or be oriented vertically or substantially vertically, may face forward, may face downwardly toward the front wheel, or the like to provide or support a desired function of the cockpit assembly 402.

In some embodiments, the first face 420 may include or define one or more features facilitating use of the micro-mobility fleet vehicle 400. For example, the first face 420 may include a headlight assembly 430. The headlight assembly 430 may illuminate a path ahead (above or below) and/or to the side of the micro-mobility fleet vehicle 400. For example, the headlight assembly 430 may be configured to illuminate a road surface substantially in front of the micro-mobility fleet vehicle 400. In some embodiments, the headlight assembly 430 may signal the presence of the micro-mobility fleet vehicle 400 to oncoming vehicular and non-vehicular traffic. In some embodiments, the headlight assembly 430 may provide one or more indications for turn signals. In some embodiments, the headlight assembly 430 may display information about the micro-mobility fleet vehicle 400. For instance, the headlight assembly 430 may turn on and/or flash in a predetermined sequence upon a user starting the micro-mobility fleet vehicle 400. In some embodiments, the headlight assembly 430 may be used to indicate a threat level of the micro-mobility fleet vehicle 400. For instance, the headlight assembly 430 may flash one or more alarm signals when there are indications of threat, such as possible theft, abandonment, and/or other critical statuses of the micro-mobility fleet vehicle 400. Each of these features are described in more detail below.

The headlight assembly 430 may include many configurations. For instance, the headlight assembly 430 may include one or more light sources having similar or different characteristics (e.g., color, luminosity, frequency, etc.) controlled individually or together as a unit. As shown in FIG. 4, the headlight assembly 430 may include a strip array 432 defining a pill-shaped center region 434 of the first face 420. The strip array 432 may be arranged in an ellipse or oval shape, with a length greater than a width, similar to a racetrack or stadium shape, to define the pill-shaped center region 434. In such embodiments, the strip array 432 may be positioned along the first face 420 such that its length is vertical or substantially vertical, though other configurations are contemplated, including rectangular, circular, and square-shaped.

The strip array 432 may provide a first lighting characteristic of the headlight assembly 430. For instance, the strip array 432 may include a plurality of light emitting and/or reflecting elements. Depending on the application, the strip array 432 may provide a passive or active lighting characteristic of the headlight assembly 430. For instance, the strip array 432 may be defined by reflective tape, paint, or other reflective material. For example, the strip array 432, as well as other reflectors of the micro-mobility fleet vehicle 400, may be defined or formed at least partially by light reflecting elements, such as reflective beads. In such embodiments, the light reflecting elements (e.g., reflective glass or other reflective material beads) may be embedded in paint, tape, and/or other elements applied or secured to the micro-mobility fleet vehicle 400 to increase nighttime safety by shining (e.g., brightly) under ambient lighting conditions and/or headlight beams.

In some embodiments, the strip array 432 may be defined by an array of light emitting diodes (LEDs) or other light emitting elements. Depending on the application, the light emitting elements may be programmable. For example, each light emitting element of the strip array 432 may be controlled by a processing element, such as controller 112, described above. The programmable light emitting elements, as controlled by a controller (e.g., controller 112), may provide a desired lighting characteristic of the headlight assembly 430. For instance, the strip array 432 may be configured to provide asymmetrically biased peripheral lighting during operation of the headlight assembly 430. For instance, the strip array 432 may be configured to provide directional lighting based on the relative position of the handlebar assembly 410. If the handlebar assembly 410 is rotated to the right (i.e., the handlebar assembly 410 is rotated to cause the micro-mobility fleet vehicle 400 to turn towards the right), the strip array 432 may provide directional lighting to the right of the vehicle. For instance, a right portion of the strip array 432 may turn on or increase in brightness to illuminate, or better illuminate, a field of view to the right of the micro-mobility fleet vehicle 400. In some embodiments, a left portion of the strip array 432 may turn off if already illuminated to limit projection of light to the left of the micro-mobility fleet vehicle 400.

Similarly, if the handlebar assembly 410 is rotated to the left (i.e., the handlebar assembly 410 is rotated to cause the micro-mobility fleet vehicle 400 to turn towards the left), the strip array 432 may provide directional lighting to the left of the vehicle. For example, a left portion of the strip array 432 may turn on or increase in brightness to illuminate, or better illuminate, a field of view to the left of the micro-mobility fleet vehicle 400. In some embodiments, a right portion of the strip array 432 may turn off if already illuminated to limit projection of light to the right of the micro-mobility fleet vehicle 400. In some embodiments, when the handlebar assembly 410 is detected as turning right or left beyond a certain threshold, the strip array 432 may automatically engage a turn signal or illumination that indicates to others that the micro-mobility fleet vehicle 400 is turning right or left, which eliminates the need for the user of the micro-mobility fleet vehicle 400 to manually operate a turn signal control.

The strip array 432 may provide the asymmetrically biased peripheral lighting during operation in other configurations. For example, the biased directional lighting provided by the strip array 432 may be based on a projected path of the micro-mobility fleet vehicle 400. For example, using GPS navigation, the strip array 432 may bias peripheral lighting to either the right or the left of the micro-mobility fleet vehicle 400 to prepare for an upcoming turn to follow a GPS navigational route. In some embodiments, the light emitting elements may move to direct light to the left or to the right of the micro-mobility fleet vehicle 400 based on the relative position of the handlebar assembly 410.

In some embodiments, the strip array 432 may be configured to provide color and/or luminosity-differentiated animated light patterns during operation. For example, the strip array 432 may provide one or more color and/or luminosity-differentiated indications for turn signals. For example, the right portion of the strip array 432 may flash one or more color and/or luminosity-differentiated indications in a predetermined sequence to indicate an upcoming right turn of the micro-mobility fleet vehicle 400, whether indicated by a user or anticipated along a GPS navigational route. In like manner, the left portion of the strip array 432 may flash one or more color and/or luminosity-differentiated indications in a predetermined sequence to indicate an upcoming left turn of the micro-mobility fleet vehicle 400, whether indicated by a user or anticipated along a GPS navigational route. In some embodiments, the strip array 432 may flash one or more color and/or luminosity-differentiated indications in a predetermined sequence upon a user starting the micro-mobility fleet vehicle 400. In some embodiments, the strip array 432 may flash one or more color and/or luminosity-differentiated indications in a predetermined sequence to indicate a threat level of the micro-mobility fleet vehicle 400, such as when there are indications of possible theft, abandonment, and/or other critical statuses of the micro-mobility fleet vehicle 400.

With continued reference to FIG. 4, the headlight assembly 430 may include a cone beam light assembly 436, whether in addition to or in lieu of the strip array 432. The cone beam light assembly 436 may be disposed within the pill-shaped center region 434 of the first face 420. The cone beam light assembly 436 may provide a second lighting characteristic of the headlight assembly 430. For instance, the cone beam light assembly 436 may include many configurations for illuminating the path ahead of the micro-mobility fleet vehicle 400. For instance, the cone beam light assembly 436 may include one or more incandescent lamps, halogen lamps, high intensity discharge lamps, LEDs, or any combination thereof providing a desired lumens output of the headlight assembly 430. The intensity or direction of light may depend on environmental conditions, as indicated by sensors on the micro-mobility fleet vehicle 400 or provided through the fleet vehicle management system, such as in foggy, rainy, snowy, or other conditions that may allow the user to better see while using the micro-mobility fleet vehicle 400. Depending on the application, the cone beam light assembly 436 may be recessed within the pill-shaped center region 434 or flush with an outer surface of the first face 420, such as to provide a desired shape of the light projected from the cone beam light assembly 436.

The first face 420 may include other features. For instance, the cockpit assembly 402 may include a camera 440 disposed on the first face 420. In some embodiments, the camera 440 may be disposed adjacent to the headlight assembly 430. For instance, the camera 440 may be disposed adjacent to the cone beam light assembly 436 within the pill-shaped center region 434 of the first face 420, though other configurations are contemplated. The camera 440 may include many configurations. For instance, the camera 440 may be configured to capture images and/or video including the road surface substantially in front of the micro-mobility fleet vehicle 400. The camera 440 may be similar to camera 138 or 148, described above.

Referring to FIG. 5, the second face 422 may include many configurations. Like the first face 420, the second face 422 may be planar, curve along its length, curve along its width, or any combination thereof. As shown, the second face 422 is disposed substantially opposite the first face 420. The second face 422 may be inclined relative to the substantially vertical first face 420. The second face 422 may extend vertically or substantially vertically, may face rearward, may face upwardly towards a rider or user support, or the like to provide or support a desired function of the cockpit assembly 402. For example, the second face 422 may include or define one or more features facilitating use of the micro-mobility fleet vehicle 400. In some embodiments, the second face 422 may include a mobile computing device holder 450. As described herein, the mobile computing device holder 450 may grasp and/or otherwise secure a portable electronic device (e.g., a smartphone, tablet, smart watch, or other mobile device) to the cockpit assembly 402. The mobile computing device holder 450 may be positioned such that the portable electronic device secured therein is easily viewable and/or readily available during operation of the micro-mobility fleet vehicle 400. In some embodiments, the mobile computing device holder 450 may be similar to the electronic device holder described in U.S. patent application Ser. No. 16/578,995, filed Sep. 23, 2019, and entitled "MICROMOBILITY ELECTRIC VEHICLE WITH ELECTRONIC DEVICE HOLDER AND INTEGRATED DISPLAY," which is hereby incorporated by reference in its entirety for all purposes.

The mobile computing device holder 450 may include many configurations. In some embodiments, the mobile computing device holder 450 may include a first gripping element 452 and a second gripping element 454 disposed on opposing sides of the mobile computing device holder 450. Each of the first gripping element 452 and the second gripping element 454 may include a pad of friction producing material to grip a mobile device, such as the side of a mobile device. The second gripping element 454 may be movable relative to the first gripping element 452 to accommodate or secure mobile computing devices of various sizes. The second gripping element 454 may be spring loaded and biased towards the first element. In such embodiments, the mobile computing device holder 450 may grip a mobile device using forces (e.g., spring-based forces) applied by the first gripping element 452 and the second gripping element 454 against the sides or edges of the mobile device within the holder. For instance, the second gripping element 454 may be extended away from the first gripping element 452 to accept a height or width of a mobile computing device. Once the second gripping element 454 is extended a sufficient distance away from the first gripping element 452, the mobile computing device may be placed within the mobile computing device holder 450 between the first gripping element 452 and the second gripping element 454. Once the mobile computing device is place within the mobile computing device holder 450, the second gripping element 454 may be collapsed towards the first gripping element 452 to secure the mobile computing device in the mobile computing device holder 450.

The first and/or second gripping elements 452 and 454 may be equipped with sensors, such as pressure, temperature, heart rate, and perspiration sensors, that enable the micro-mobility fleet vehicle 400 and/or the fleet management system to receive data from such sensors and adjust the ride or operation of the micro-mobility fleet vehicle 400 accordingly. For example, if heart rate increases beyond a certain threshold and pressure applied to one or both of the gripping elements has increased, the user may be determined to be nervous or under stress, and appropriate action can be taken, such as reducing the speed of the micro-mobility fleet vehicle 400.

In some embodiments, the second face 422 may include a user interface 460 for the micro-mobility fleet vehicle 400. The user interface 460 may be configured to face a user of the micro-mobility fleet vehicle 400. The user interface 460 may include a display 462 configured to present information or other data to the user during operation. The user interface 460 may be similar to the user interface 113 or 132, described above. For example, the user interface 460 may present route guidance information, usage cost, battery charge status, a predicted remaining range, or other suitable information related to the micro-mobility fleet vehicle 400, as described above. In some embodiments, the user interface 460 may present information similar to that described in U.S. patent application Ser. No. 16/578,995, filed Sep. 23, 2019, and entitled "MICROMOBILITY ELECTRIC VEHICLE WITH ELECTRONIC DEVICE HOLDER AND INTEGRATED DISPLAY," which is hereby incorporated by reference in its entirety for all purposes. The user interface 460 may also present other information useful during operation of the micro-mobility fleet vehicle 400, such as time information, map or navigation information, or the like. The display 462 may be an electronic ink display, though other configurations are contemplated.

As shown, the user interface 460 may be disposed adjacent to and/or beneath the mobile computing device holder 450. For example, the user interface 460 may be arranged between the first gripping element 452 and the second gripping element 454 of the mobile computing device holder 450. Thus, the user interface 460 may be at least partially concealed by or hidden behind a mobile device positioned within the mobile computing device holder 450. In such embodiments, the display of the mobile device may present the same, different, or additional information that the display 462 is configured to present. In addition, the display 462 may be turned off or dimmed when a mobile device is secured within the mobile computing device holder 450 to save power.

The mobile device within the mobile computing device holder 450 may control one or more electronics of the micro-mobility fleet vehicle 400, such as through a wired connection, short range wireless communication, and/or through connection over a wide area network to a server exchanging information with control electronics of the micro-mobility fleet vehicle 400. For example, when positioned within the mobile computing device holder 450, a mobile device may provide an interface through which a user may provide or receive commands or information about the state of the micro-mobility fleet vehicle 400 during operation. Such interface functionality may be provided by an app on the mobile device.

Referring to FIGS. 4 and 5, the intermediate portion 424 may define a fold or arcuate portion linking the first face 420 to the second face 422. For example, the intermediate portion 424 may connect a first top portion of the first face 420 to a second top portion of the second face 422. In this manner, the first face 420, the second face 422, and the intermediate portion 424 may form part of a unitary structure configured to couple to the handlebar assembly 410. For example, the first face 420, the second face 422, and the intermediate portion 424 may wrap at least partially around the handlebar assembly 410 to position the first face 420 on a forward-facing portion of the micro-mobility fleet vehicle 400 and the second face 422 on a rearward facing portion of the micro-mobility fleet vehicle 400. In some embodiments, the first face 420, the second face 422, and the intermediate portion 424 may wrap at least partially around the handlebar assembly 410 to orient the first face 420 towards a front of the handlebar assembly 410 and/or the micro-mobility fleet vehicle 400 and the second face 422 towards a rear of the handlebar assembly 410 and/or the micro-mobility fleet vehicle 400. Depending on the application, the cockpit assembly 402 may wrap at least partially around a central stem assembly of the handlebar assembly 410. As described herein, the central stem assembly may include at least portions of a headset, a stem, and/or other mechanical elements of the handlebar assembly 410 configured to form the handlebar assembly 410 and mechanically couple the handlebar assembly 410 to the steering column/mechanism of the micro-mobility fleet vehicle 400.

In some embodiments, the intermediate portion 424 may include an arc length S to position the first face 420 in a first position angled forwardly away from a rider during operation of the micro-mobility fleet vehicle 400, and to position the second face 422 in a second position angled towards the rider. In some embodiments, the intermediate portion 424 may include or define an arcuate panel curved along the long axis of the handlebar assembly 410. As shown, the first face 420 may be angled forwardly away from the user support 404, such as forwardly away from a seat. For instance, the first face 420 may face away from a rider of the fleet vehicle 400 when the rider is positioned on the user support 404. In such embodiments, the second face 422 may be angled rearwardly towards the user support 404. For example, the second face 422 may face the user support 404 or face a rider of the fleet vehicle 400 when the rider is positioned on the user support 404.

In some embodiments, the user support 404, such as a standing platform, may define a first plane, and the second face 422 may define a second plane. In such embodiments, the first plane may be at an angle to the second plane. For instance, the angle between the first plane and the second plane may be 90°, approximately 90°, less than 90°, or greater than 90° such that the second face 422 faces a rider of the fleet vehicle 400 during operation. For example, the second face 422 may be positioned to define a diagonal plane creating an angle to a vertical or horizontal axis of the fleet vehicle 400.

In some embodiments, the first face 420 and the second face 422 may extend tangentially from the intermediate portion 424 to provide a smooth wrap around design of the cockpit assembly 402. For example, the first face 420 may be defined, at least partially, by a tangent plane to the intermediate portion 424 at a first point or line 406, with the first face 420 extending from the intermediate portion 424 at the first point or line 406. Similarly, the second face 422 may be defined, at least partially, by a tangent plane to the intermediate portion 424 at a second point or line 406, with the second face 422 extending from the intermediate portion 424 at the second point or line 408. As shown, the first point or line 406 may be positioned on a front portion of handlebar assembly 410, and the second point or line 408 may be positioned on a rear portion of the handlebar assembly 410 to wrap the cockpit assembly 402 at least partially around the handlebar assembly 410.

The cockpit assembly 402 may form at least a portion of an outer housing 470 of the handlebar assembly 410. For example, as shown in FIG. 4, the cockpit assembly 402 may interface with a clamshell housing 472 to form the outer housing 470 of the handlebar assembly 410. The interface between the cockpit assembly 402 and the clamshell housing 472 may provide a weathertight seal of the outer housing 470. For instance, the interface between the cockpit assembly 402 and the clamshell housing 472 may seal the interior of the outer housing 470 from rain, moisture, or other debris ingress.

Referring to FIG. 4, the cockpit assembly 402 may include other features. For instance, the cockpit assembly 402 may include a control module 480 and a wiring harness 482. The control module 480, which may be positioned between the first face 420 and the second face 422, may include one or more processing elements, memory, or other electronic elements or modules to control operation of the cockpit assembly 402 and/or the micro-mobility fleet vehicle 400. For instance, the cockpit assembly 402 may be configured to receive and/or control power provided by a power source (e.g., battery) for an electric motor of a propulsion system of the micro-mobility fleet vehicle 400. In some embodiments, the control module 480 may include the display 462, which may be attached to the second face 422. The wiring harness 482 may provide an interface between the cockpit assembly 402 (e.g., the control module 480) and electronic cabling 484 (e.g., for the throttle, wheel motors, etc.). For example, the wiring harness 482 may provide a simple one connector attachment of the cockpit assembly 402 to one or more electronic cabling 484 or other electronics of the micro-mobility fleet vehicle 400.

The cockpit assembly 402 may be assembled to the micro-mobility fleet vehicle 400 in many configurations. For example, the headlight assembly 430 may be coupled to the first face 420 of the cockpit assembly 402. The mobile computing device holder 450 and/or the display 462 of the user interface 460 may be coupled to the second face 422 of the cockpit assembly 402. The assembled cockpit assembly 402 may then be coupled to the micro-mobility fleet vehicle 400 such that the cockpit assembly 402 wraps at least partially around the handlebar assembly 410, such as at least partially around a central stem assembly of the handlebar assembly 410.

Figure 6B:
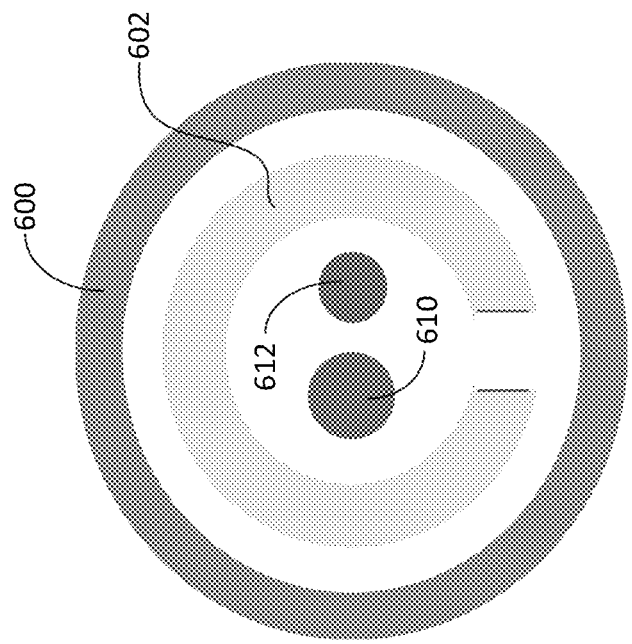
FIG. 6B illustrates another cable routing through a column and/or stem of a micro-mobility fleet vehicle in accordance with an embodiment of the disclosure.
Figure 6A:
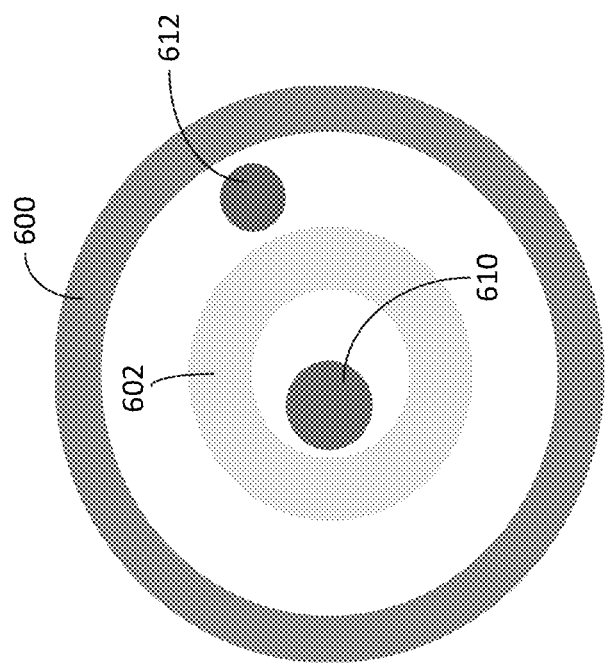
FIG. 6A illustrates a cable routing through a column and/or stem of a micro-mobility fleet vehicle in accordance with an embodiment of the disclosure.

FIGS. 6A and 6B illustrates optional cable routing through the micro-mobility fleet vehicle 400 in accordance with an embodiment of the disclosure. In some embodiments, the micro-mobility fleet vehicle 400 may include a column 600 and a stem 602 rotatably coupled to the column 600. The column 600 may be referred to as a head tube, and the stem 602 may be referred to as a steer tube. Depending on the application, the handlebar assembly 410 may be coupled to one end of the stem 602, with the other end of stem 602 coupled to the front wheel such that user rotation of the handlebar assembly 410 causes corresponding rotation of the front wheel. The column 600 and/or stem 602 may include a channel to allow cabling (e.g., for brakes, throttle, electronics, etc.) to be placed internal to the column 600 and/or stem 602. For example, one or more cables (e.g., a brake cable 610, a cockpit controller cable 612, or the like)

may be routed through the column 600 and/or the stem 602. FIG. 6A illustrates a first cable routing through the column 600 and stem 602. As shown, each of column 600 and stem 602 may be a hollow tube, with the stem 602 positioned within the column 600. In FIG. 6A, the brake cable 610 may be routed through the stem 602, with the cockpit controller cable 612 routed in the space between the stem 602 and the column 600. In FIG. 6B, both the brake cable 610 and the cockpit controller cable 612 may be routed through the stem 62. Such configurations are exemplary only, and other routing configurations are contemplated.

Figure 7:
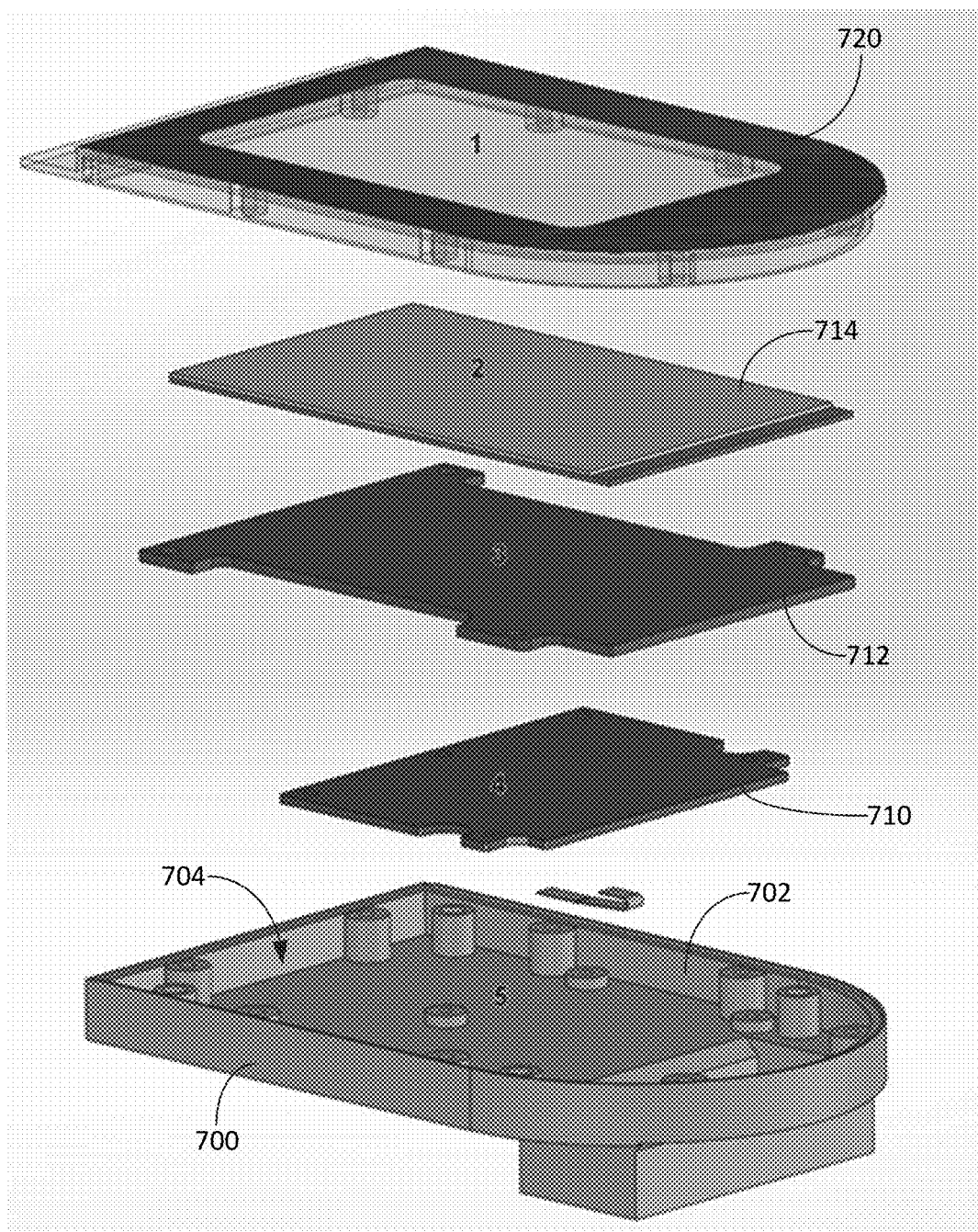
FIG. 7 illustrates an exploded view of a control module in accordance with an embodiment of the disclosure.

FIG. 7 illustrates an exploded view of control module 480 in accordance with an embodiment of the disclosure. As shown, control module 480 may include a plurality of components, modules, or assemblies assembled together as a unit. For example, the control module 480 may include a housing 700 with an outer wall 702 defining an interior recess 704. The housing 700 may be plastic and may include a compressible overmold for a waterproof seal. The control module 480 may include one or more components, modules, or assemblies positioned within the interior recess 704 of the housing 700. For example, the control module 480 may include a main logic board (MLB) 710 with one or more chipsets and connectors. Positioned above the MLB 710 may be a midframe 712. The midframe 712 may include any number of printed circuit boards, NFC antennas, ALS, or the like. Positioned above the midframe 712 may be a display 714. The display 714 may be similar to the display 462 of FIG. 5, described above. For example, the display 714 may be an electronic ink display with a laminated front light. Positioned above the display 714 may be a cover lens 720. The cover lens 720 may interface with the housing 700 (e.g., with the outer wall 702 of the housing 700) to seal the control module 480. In some embodiments, the cover lens 720 may interface with the second face 422 of the cockpit assembly 402 to secure the control module 480 to the second face 422.

Figure 8:
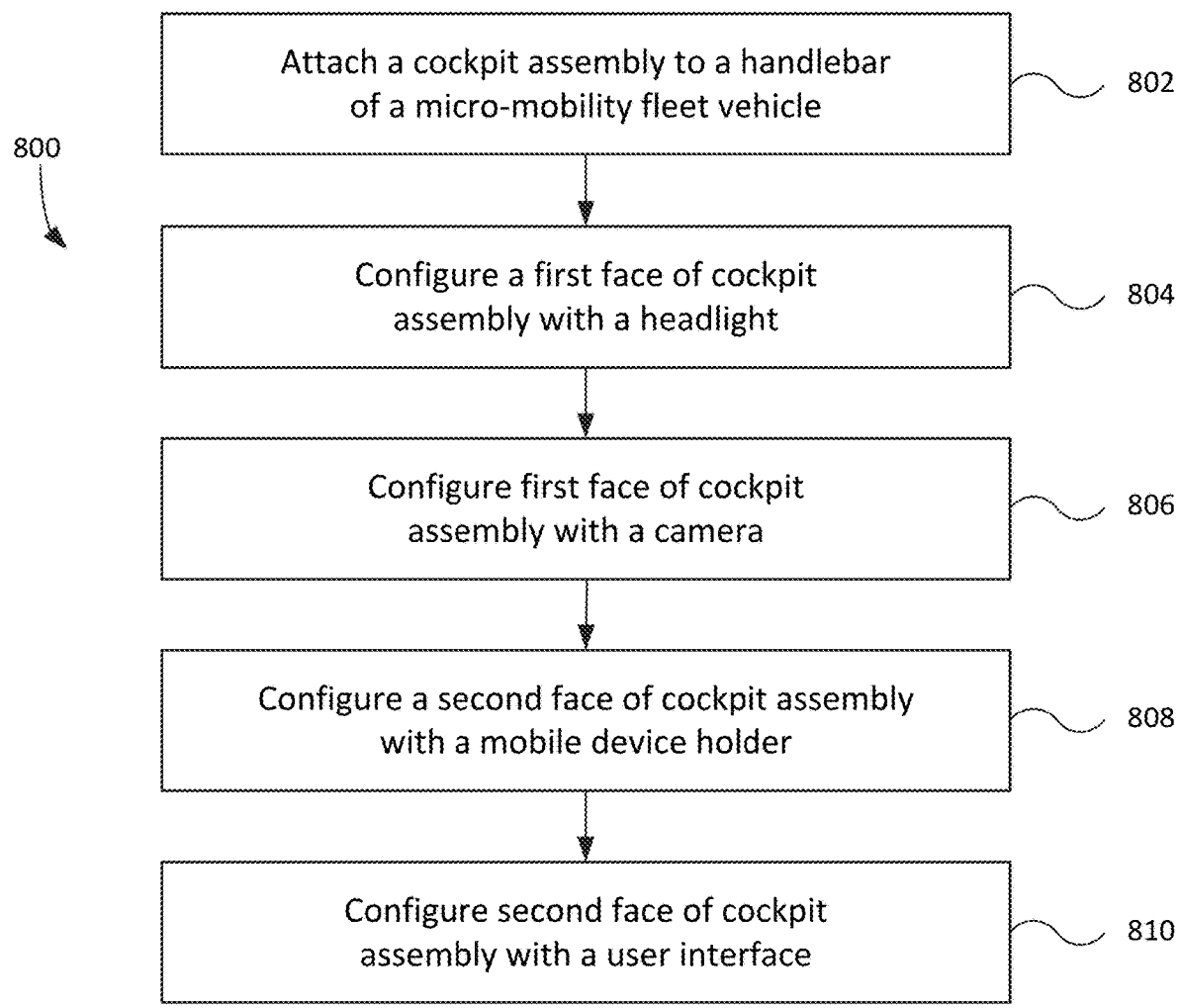
FIG. 8 illustrates a flow diagram of a process of assembling a cockpit assembly in accordance with an embodiment of the disclosure.

FIG. 8 illustrates a flow diagram of a process 800 of assembling a cockpit assembly in accordance with an embodiment of the disclosure. It should be appreciated that any step, sub-step, sub-process, or block of process 800 may be performed in an order or arrangement different from the embodiments illustrated by FIG. 8. For example, one or more blocks may be omitted from or added to the process 800. Although process 800 is described with reference to the embodiments of FIGS. 1-7, process 800 may be applied to other embodiments.

In block 802, process 800 includes attaching a cockpit assembly to a handlebar of a micro-mobility fleet vehicle. For instance, cockpit assembly 402 may be attached to handlebar assembly 410 of micro-mobility fleet vehicle 400, described above. The cockpit assembly may include a first face, a second face, and an intermediate portion connecting the first face to the second face, the intermediate portion having an arcuate shape to position the first face on one side of the micro-mobility fleet vehicle and the second face on another side of the micro-mobility fleet vehicle. The intermediate portion may include an arc length to position the first face in a first position angled forwardly away from a user during operation of the micro-mobility fleet vehicle, and to position the second face in a second position angled towards the user. Both the first face and the second face may extend tangentially from the intermediate portion. The first face, second face, and intermediate portion may be similar to first face 420, second face 422, and intermediate portion 424, described above. The cockpit assembly may be modular to enable the assembly to be easily attached and removed from different micro-mobility fleet vehicles, such as through a "snapping" configuration. In other embodiments, the cockpit assembly may be more secure and attached through nuts and bolts and other fastening systems, including ones that require keys or other means to remove.

In block 804, process 800 may include configuring the first face with a headlight. For example, the first face may be provided with a cone beam light assembly for illuminating a path ahead of the micro-mobility fleet vehicle. Additionally, or alternatively, the first face may be provided with a strip array of light emitting elements for illuminating a path ahead and/or to the side of the micro-mobility fleet vehicle. The strip array of light emitting elements may define a pill-shaped center region of the first face. The cone beam light assembly may be disposed within the pill-shaped center region. The headlight may be similar to headlight assembly 430, described above. The strip array may be similar to strip array 432, described above. The cone beam light assembly may be similar to cone beam light assembly 436, described above.

In block 806, process 800 may include configuring the first face with a camera. The camera may be disposed within the pill-shaped center region of the first face. The camera may be disposed adjacent to the cone beam light assembly within the pill-shaped center region. The camera may be similar to camera 440, described above.

In block 808, process 800 may include configuring the second face with a mobile device holder. The mobile device holder may be configured to grasp or otherwise secure a portable electronic device to the cockpit assembly. The mobile device holder may include a pair of gripping elements. At least one of the gripping elements may be movable relative to the other gripping element to accommodate portable electronic devices of various sizes. The gripping elements may be spring-loaded to bias the gripping elements together to hold the portable electronic device. The mobile device holder may be similar to mobile computing device holder 450, described above.

In block 810, process 800 may include configuring the second face with a user interface. The user interface may present information or other date (e.g., route guidance, notifications, status, etc.) to the user during operation. The user interface may include a display, such as an electronic ink display. The user interface may be disposed beneath the mobile device holder.

Figure 9:
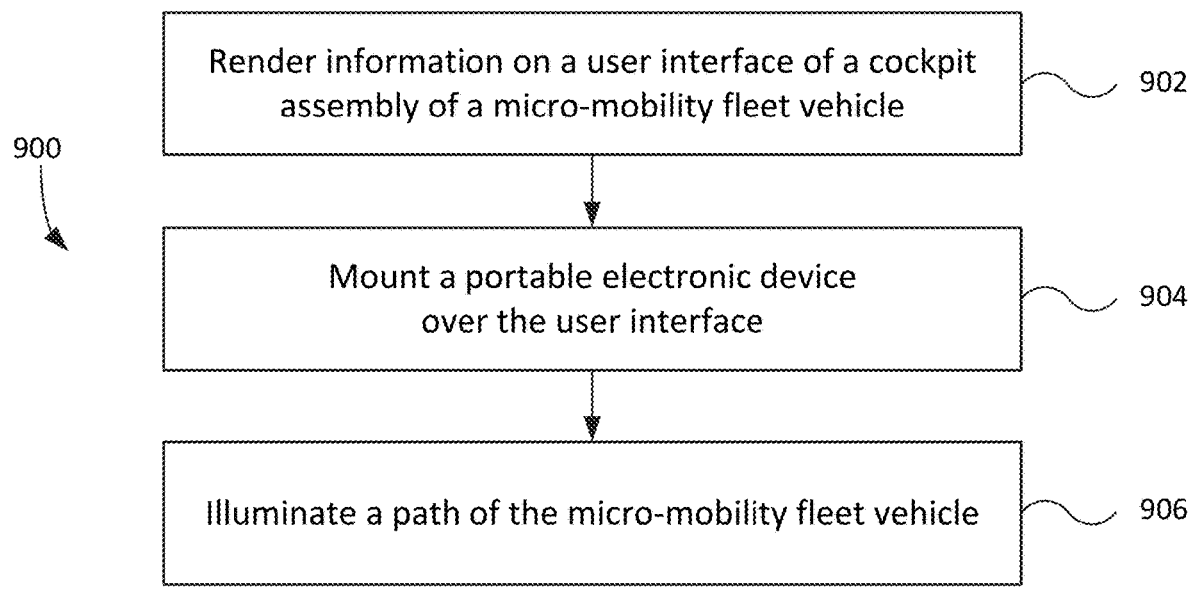
FIG. 9 illustrates a flow diagram of a process of using a cockpit assembly in accordance with an embodiment of the disclosure.

FIG. 9 illustrates a flow diagram of a process 900 of using a cockpit assembly in accordance with an embodiment of the disclosure. It should be appreciated that any step, sub-step, sub-process, or block of process 900 may be performed in an order or arrangement different from the embodiments illustrated by FIG. 9. For example, one or more blocks may be omitted from or added to the process 900. Although process 900 is described with reference to the embodiments of FIGS. 1-7, process 900 may be applied to other embodiments.

In block 902, process 900 includes rendering information on a user interface of a cockpit assembly of a micro-mobility fleet vehicle. The cockpit assembly may include a first face, a second face, and an intermediate portion connecting the first face to the second face, the intermediate portion having an arcuate shape to position the first face on one side of the micro-mobility fleet vehicle and the second face on another side of the micro-mobility fleet vehicle. The intermediate portion may include an arc length to position the first face in a first position angled forwardly away from a user during operation of the micro-mobility fleet vehicle, and to position the second face in a second position angled towards the user. Both the first face and the second face may extend tangentially from the intermediate portion. The user interface may be provided on the second face. The first face, second face, and intermediate portion may be similar to first face 420, second face 422, and intermediate portion 424, described above.

In block 904, process 900 may include mounting a portable electronic device over the user interface. For example, the portable electronic device may be mounted to a mobile device holder of the cockpit assembly. The mobile device holder may be disposed on the second face of the cockpit assembly. The mobile device holder may be similar to mobile computing device holder 450, described above.

In block 906, process 900 may include illuminating a path of the micro-mobility fleet vehicle. For instance, the path may be illuminated by a headlight disposed on the front face of the cockpit assembly. The headlight may include a cone beam light assembly for illuminating a path ahead of the micro-mobility fleet vehicle. Additionally, or alternatively, the headlight may include a strip array of light emitting elements for illuminating a path ahead and/or to the side of the micro-mobility fleet vehicle. The strip array of light emitting elements may define a pill-shaped center region of the first face. The cone beam light assembly may be disposed within the pill-shaped center region. The headlight may be similar to headlight assembly 430, described above. The strip array may be similar to strip array 432, described above. The cone beam light assembly may be similar to cone beam light assembly 436, described above.

Embodiments of the present disclosure can thus provide relatively low cost, reliable, and robust network connectivity and fleet data sharing for a group of fleet vehicles when alternative communication services are unavailable or expensive. Moreover, embodiments may also provide a mobile mesh network provisioning system capable of assisting in transportation system management and user navigation of fleet vehicles through use of position estimates based on range determinations derived from mere operation of the mobile mesh network, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A cockpit assembly for a micro-mobility fleet vehicle, the cockpit assembly comprising:
   a first face comprising a headlight assembly configured to illuminate a road surface substantially in front of the micro-mobility fleet vehicle, the headlight assembly comprising a strip array of light emitting elements arranged to define a pill-shaped center region of the first face;
   a second face disposed substantially opposite the first face and comprising a mobile computing device holder or a display of a user interface for the micro-mobility fleet vehicle; and
   an intermediate portion connecting a first top portion of the first face to a second top portion of the second face, wherein the first face, the second face, and the intermediate portion are configured to wrap at least partially around a handlebar assembly for the micro-mobility fleet vehicle to orient the first face towards a front of the micro-mobility fleet vehicle and the second face towards a rear of the micro-mobility fleet vehicle, and wherein the first face, the second face, and the intermediate portion form part of a unitary structure configured to couple to the handlebar assembly for the micro-mobility fleet vehicle.

2. The cockpit assembly of claim 1, wherein:
   the second face comprises the mobile computing device holder; and
   the mobile computing device holder comprises a first gripping element and a second gripping element movable relative to the first gripping element to secure mobile computing devices of various sizes to the cockpit assembly.

3. The cockpit assembly of claim 2, wherein:
   the first gripping element and the second gripping element are disposed on opposing sides of the mobile computing device holder; and
   the second gripping element is spring loaded and biased towards the first element.

4. The cockpit assembly of claim 1, wherein:
   the second face comprises the display of the user interface for the micro-mobility fleet vehicle;
   the second face is configured to be oriented substantially towards a seat of the micro-mobility fleet vehicle; and
   the display comprises an electronic ink display.

5. The cockpit assembly of claim 1, wherein the strip array comprises a plurality of programmable light emitting elements.

6. The cockpit assembly of claim 1, wherein the headlight assembly comprises a cone beam light assembly disposed within the pill-shaped center region of the first face.

7. The cockpit assembly of claim 1, further comprising a camera disposed within the pill-shaped center region of the first face, wherein:
   the intermediate portion comprises an arcuate panel curved along a long axis of the handlebar assembly;
   the first face is configured to be oriented substantially vertically; and
   the camera is configured to capture images and/or video comprising the road surface substantially in front of the micro-mobility fleet vehicle.

8. A micro-mobility fleet vehicle comprising the cockpit assembly of claim 1, wherein:
   the micro-mobility fleet vehicle comprises a sit scooter, a bicycle, or a kick scooter;

the sit scooter, the bicycle, or the kick scooter comprise a propulsion system including a battery and an electric motor; and the cockpit assembly is configured to receive power from the battery for the propulsion system.

9. A method for assembling a micro-mobility fleet vehicle comprising the cockpit assembly of claim 1, the method comprising:

coupling the headlight assembly to the first face of the cockpit assembly;

coupling the mobile computing device holder and/or the display of the user interface for the micro-mobility fleet vehicle to the second face of the cockpit assembly; and coupling the cockpit assembly to the micro-mobility fleet vehicle such that the cockpit assembly wraps at least partially around a central stem assembly of the handlebar assembly for the micro-mobility fleet vehicle.

10. A method for operating the cockpit assembly of claim 1, wherein the mobile computing device holder comprises a first gripping element and a second gripping element movable relative to the first gripping element to secure mobile computing devices of various sizes to the cockpit assembly, the method comprising:

extending the second gripping element away from the first gripping element to accept a height or a width of a mobile computing device;

placing the mobile computing device within the mobile computing device holder between the first gripping element and the extended second gripping element; and collapsing the second gripping element towards the first gripping element to secure the mobile computing device in the mobile computing device holder.

11. A micro-mobility fleet vehicle comprising:

a handlebar assembly; and a cockpit assembly coupled to the handlebar assembly, the cockpit assembly comprising:

a substantially vertical first face comprising a headlight assembly configured to illuminate a road surface substantially in front of the micro-mobility fleet vehicle, the headlight assembly comprising a strip array of light reflecting elements arranged to define a pill-shaped center region of the first face;

a second face, inclined relative to the substantially vertical first face, comprising a mobile computing device holder or a display of a user interface for the micro-mobility fleet vehicle; and an intermediate portion connecting the first face to the second face, wherein the first face, the second face, and the intermediate portion are wrapped at least partially around the handlebar assembly to orient the first face towards the front of the micro-mobility fleet vehicle and the second face towards the rear of the micro-mobility fleet vehicle.

12. The micro-mobility fleet vehicle of claim 11, wherein the intermediate portion comprises an arcuate panel curved along a long axis of the handlebar assembly and configured to orient the first face away from a user support of the micro-mobility fleet vehicle and to orient the second face towards the user support.

13. The micro-mobility fleet vehicle of claim 12, wherein:

the cockpit assembly is implemented as a unitary structure that forms at least a portion of an outer housing of the handlebar assembly; and the user support comprises a seat or a standing platform of the micro-mobility fleet vehicle.

14. A cockpit assembly for a micro-mobility fleet vehicle, the cockpit assembly comprising:

two at least partially opposed faces linked by an arcuate panel curved along a long axis of a handlebar assembly, the two at least partially opposed faces comprising a first face and a second face, wherein:

the first face comprises a headlight assembly, the headlight assembly comprising a strip array of light emitting elements defining a pill-shaped center region of the first face, the second face comprises a mobile computing device holder, and the second face comprises display for a user interface for the micro-mobility fleet vehicle that is disposed adjacent to and/or beneath the mobile computing device holder and is configured to face a rear of the micro-mobility fleet vehicle.

15. The cockpit assembly of claim 14, wherein:

the headlight assembly comprises a cone beam light assembly disposed within the pill-shaped center region.

16. The cockpit assembly of claim 14, wherein the strip array comprises a plurality of light emitting diodes.

17. The cockpit assembly of claim 11, wherein the strip array comprises a reflective tape.

18. The cockpit assembly of claim 14, wherein the strip array comprises a plurality of programmable light emitting elements configured to provide asymmetrically biased peripheral lighting during operation of the headlight assembly.

19. The cockpit assembly of claim 14, wherein the strip array comprises a plurality of programmable light emitting elements configured to provide color and/or luminosity-differentiated animated light patterns during operation of the headlight assembly.

20. The cockpit assembly of claim 14, further comprising a camera disposed within the pill-shaped center region of the first face.

21. The cockpit assembly of claim 14, further comprising a control module disposed between the first face and the second face of the cockpit assembly.

22. The cockpit assembly of claim 14, wherein the display of the user interface for the micro-mobility fleet vehicle is configured to provide a notification, from a management system of a dynamic transportation matching system incorporating the micro-mobility fleet vehicle.

* * * * *